July 20, 1954     G. MATTIS     2,684,123

TIRE LUBRICATION APPARATUS

Filed April 22, 1950

INVENTOR.
GEORGE MATTIS
BY
Joseph B. Gardner
atty.

Patented July 20, 1954

2,684,123

UNITED STATES PATENT OFFICE 2,684,123

TIRE LUBRICATION APPARATUS

George Mattis, Oakland, Calif.

Application April 22, 1950, Serial No. 157,553

1 Claim. (Cl. 180—1)

This invention relates to apparatus for attachment to rubber-tired automotive vehicles for facilitating swinging movements of the steerable wheels of the vehicle particularly in parking maneuvers and during intervals when the vehicle is stationary.

An object of the invention is to provide apparatus of the class described, controllable at the discretion of the vehicle operator, for applying to the surface of a comparatively dry pavement and in proximity to the bearing points of the tires of the vehicle's steerable wheels on the pavement, selected amounts of a lubricant material for reducing the frictional grip of the tires on the pavement so that the former may be easily swung about their vertical steering axes without requiring forward or rearward so-called "jockeying" movements to facilitate the tire movements.

Another object of the invention is to provide apparatus of the character referred to in which water or an aqueous solution supplied from a storage reservoir on the vehicle is utilized as the tire lubricant and in which interconnection is made with the vehicle motor cooling system so that each time that water is added to the vehicle radiator a portion of the water will be allotted to the reservoir so that the contents of the latter will be adequately maintained.

A further object of the invention is to provide comparatively simple apparatus of the character referred to which may be readily installed in the average automotive vehicle without any appreciable alteration or rearrangement of the existing structural parts of the vehicles.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to the drawing.

In the procedure of maneuvering an automobile into a parking space of limited size, the usually required operations of repeatedly reciprocably swinging the steerable wheels of the vehicle in the intervals when the latter is comparatively stationary not only requires considerable physical effort but also places highly undesirable severe strain on the steering gear and the linkage mechanism interconnecting the latter and the said wheels. These undesirable conditions are further accentuated in vehicles using balloon type low pressure tires since in this type an exceptionally large peripheral area of the tire tread is pressed flat against the pavement surface and more twisting force must therefore be exerted on the wheels to overcome the frictional grip of the tires on the pavement. In addition to the damaging strain which is imposed on the steering mechanism the tire casings of the steerable wheels are subjected to twisting strains which may be severe enough to effect cord breakage or separation in the pressure area of the tire radially inwardly of the tread thereof. Such unseen damage can eventually lead to tire breakdown and possibly disastrous life-endangering blowouts. Many motorists, particularly sales representatives or the like who, during the course of a day, are required to frequently park their vehicles in curbside spaces, make a habit of appreciably overinflating the steerable tires of the vehicle so as to reduce tread contact thereof with the pavement and thereby lessen the effort required to jockey the vehicle into and out of parking spaces. This practice, however, if made habitual, produces hard riding and excessive road rebound in the front end of the vehicle during normal or fast driving and also leads to excessive wear taking place in the central peripheral portions of the treads of the tires.

Figure 1:
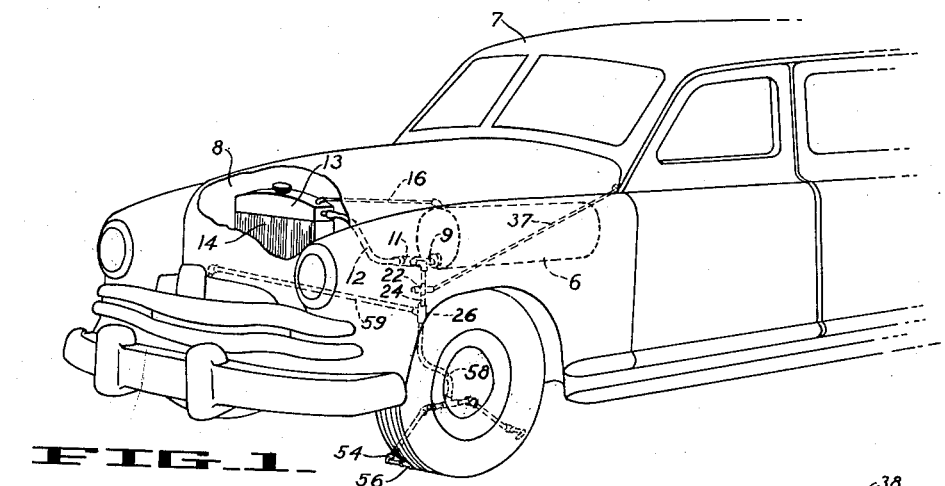
Figure 1 is a perspective view of the frontal portion of an automobile showing the improved tire lubrication apparatus of my invention installed therein. Portions of the view are broken away so as to more clearly disclose details of internal construction.

I have developed comparatively simple apparatus, capable of ready attachment to the average automotive vehicle, which functions to apply lubricant material immediately adjacent the point of tire engagement with the pavement so that frictional grip of the tire tread on the pavement will be lessened and the effort required to operate the steering wheel will be correspondingly reduced. As illustrated in Figure 1 of the drawing a storage reservoir is provided, here shown as a tank 6, suitably supported within the body structure of the automobile 7 preferably within the motor compartment 8 thereof and adapted to contain water which may enter said tank through a pipe conduit 9, an extensive T fitting 11 or its equivalent and a preferably flexible hose 12 connected with the upper tank 13 of the vehicle radiator 14. Thus whenever water is added to the radiator during servicing of the vehicle sufficient water will be admitted to the tank 6 to keep the latter filled. An air vent and overflow comprising a conduit 16 is provided running from an upper portion of the tank 6 into the upper radiator tank 13.

Figure 4:
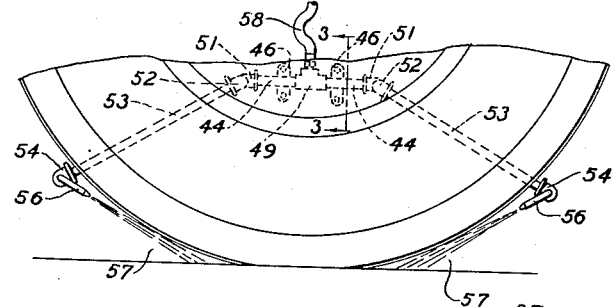
Figure 4 is an enlarged side elevational view, partly in vertical section, of a form of flow control valve for the apparatus.
Figure 4:
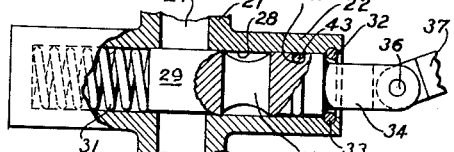

Secured in the side outlet 17 of the T fitting 11 is a downwardly directed elbow 18 and an associated nipple 19, the latter being secured in the upper side boss 21 of an axially horizontal valve body 22 whose opposite lower side boss 23, which is axially aligned with the boss 21, is connected with a nipple 24 secured at its lower end in a T fitting 26. Both of the side bosses 21 and 23 are provided with coaxial bores 27 in flow communication respectively with the nipples 19 and 24 and transaxially intersecting a bore 28 formed in and extending longitudinally of the valve body 22 and opening at one end of the latter. Slidable in the bore 28 is a valve plunger 29 interposed between an end of which and the bottom of the former bore is a coil spring 31 expansive to urge the plunger toward the open end of the bore, the plunger being limited in such movement by engagement with a snap ring 32 removably seated in a peripheral groove 33 formed in the side wall of the bore 28 adjacent the open end of the latter. A stem 34 preferably formed integrally with and extending axially from an end of the valve plunger 29 through the open end of the bore 28 is provided at its outer end with a transaxial pivot pin 36 to which is connected an end of a control rod 37 extending slidably into the operator's compartment of the vehicle preferably through the dashboard 38 and fitted at its distal end with a control knob 39 or the like disposed within convenient reach of the operator. Provided intermediate the ends of the valve plunger 29 is a transaxially-extending valve passage 41 preferably similar in cross-sectional area to the coaxial bores 27 of the valve bosses 21 and 23 and normally positioned, when the valve plunger 29 is in engagement with the stop ring 32, in radially offset relation with the said bores. Thus the operator, by manually engaging the control knob 39 and pushing the latter inwardly, toward the dashboard 38, may cause the valve plunger 29 to be moved, against the expansive force of the spring 31, axially of the bore 28 to bring the valve passage 41 into axial registry with the coaxial valve bores 27 so as to permit flow of fluid from the tank 6 through the valve and downwardly through the conduit nipple 24. Release of the control knob 39 permits the return of the valve plunger to its normal off position shown in Figure 4 wherein the solid portion of the valve plunger adjacent the passage 41 will extend across the valve bores 27 and block further passage of fluid therethrough. In order to preclude leakage of fluid between the valve bore 28 and plunger 29 and out of the open end of the former, the end of the plunger adjacent the junction therewith of the stem 34 is provided with a peripheral groove 42 containing a toroidal rubber sealing ring 43 sized to exert sufficient radial pressure against the bottom of the groove 42 and the periphery of the bore 28 to effect the aforesaid seal.

Figure 2:
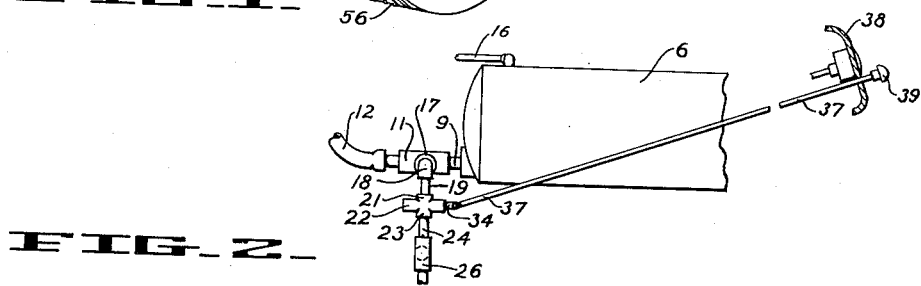
Figure 2 is an enlarged portional side elevational view of one of the vehicle wheels showing the connection to the mounting thereof of the spray nozzles and the associated lubricant supply and control apparatus for the nozzles.
Figure 3:
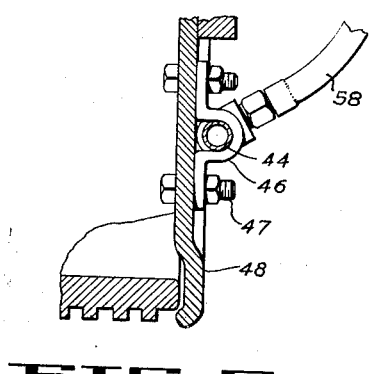
Figure 3 is an enlarged portional vertical sectional view taken in the plane indicated by the line 3—3 of Figure 2.

Means are provided for distributing fluid lubricant from the supply tank 6 to the pavement in the areas thereof immediately enclosing the contacting peripheral portions of the front wheel tire treads so as to facilitate slippage of the latter on the pavement during swinging movements of the vehicle's steerable wheels during parking maneuvers. As shown in Figures 2 and 3, axially horizontal header pipes 44 are secured by suitable strap brackets 46 and mounting bolts 47 to the lower inboard surface of each front wheel brake backing plate 48 and are fitted in their medial portions with the fittings 49 and at their ends with laterally directed elbows 51 connected through suitable close nipples with similar angularly downwardly directed elbows 52. Distributor pipes 53, connected at their upper ends in the elbows 52, extend angularly downwardly to terminate in fittings, here shown as elbows 54, disposed preferably outwardly beyond the peripheries of the tire treads, the latter fittings being connected with pipe nozzles 56 suitably formed and positioned overlying the said treads to direct fluid lubricant which may be discharged through the respective nozzles into the cuneate spaces 57 defined by the pavement surface and the upwardly receding surfaces of the tire treads lying peripherally beyond the area of tread contact with the pavement. The header T 49 of the vehicle wheel proximate to the T fitting 26 is connected to the latter by a length of flexible tubing 58 while the other header T is similarly connected with the distal end of a conduit 59 connected into the side outlet of the T 26 and extending transversely of the vehicle either forwardly or rearwardly of the radiator 14 as may be convenient. It will be seen that when the control valve is actuated by the vehicle operator, lubricant from the tank 6 will be caused to flow into and to be forcibly discharged from the several nozzles 56 to thoroughly wet the pavement around the tires and to penetrate the grooves or other division elements in the treads so that as great an area as possible directly under the tires is moistened. Thus when the otherwise stationary front wheels of the vehicle are swung in one direction or the other during parking maneuvers the bearing surfaces of the tire treads will have suitably lubricated pavement areas to pivot on and both the physical effort required to swing the wheels and the mechanical strain on the steering gear parts will be greatly reduced.

It is to be pointed out that the nozzles 56 are situated sufficiently above the pavement surface to clear the average irregularities such as bumps or small rocks or the like which may be encountered on the road and that the connection between the elbows 51 and 52 is pivotally yieldable under considerable twisting force so that in the event that a front tire should become punctured and go flat, the nozzles 56 in engaging pavement surface will cause the distributor pipes 53 to swing upwardly thus protecting the latter and the nozzles 56 against damage under the weight of the descending vehicle. After the damaged tire has been replaced, the distributor pipes may be manually adjusted to again properly position the nozzles relative to the tire and the pavement surface.

I claim:

In an automotive wheeled vehicle including a pair of steerable wheels having brake mounting plates thereon, a fluid reservoir carried by said vehicle, tubular headers connected to inboard portions of the brake mounting plates of said steerable wheels, distribution pipes pivotally engaged with ends of said headers and extending oppositely outwardly of said wheels to terminate adjacent the peripheries of the tire treads of the latter, nozzles carried by the distal ends of said distribution pipes and arranged to project fluid from said reservoir into the cuneate spaces between the tire treads and the pavement surface to lubricate the latter surface so that the tires may readily pivotally move thereon, conduit means interconnecting said reservoir and said tubular headers, a valve in flow communication with said conduit means, means normally closing said valve so as to shut off said nozzles from said reservoir, and a control rod operatively connected to said valve and extending into the operator's compartment of said vehicle and manually operable to open said valve.

References Cited in the file of this patent

UNITED STATES PATENTS

| Number | Name | Date |
|---|---|---|
| 742,786 | Green | Oct. 27, 1903 |
| 1,406,530 | Brenneisen | Feb. 14, 1922 |
| 1,447,004 | Anthon | Feb. 27, 1923 |
| 2,184,969 | Allen | Dec. 26, 1939 |
| 2,250,795 | Fitzgerald et al. | July 29, 1941 |
| 2,388,114 | Boyce | Oct. 30, 1945 |

FOREIGN PATENTS

| Number | Country | Date |
|---|---|---|
| 9,784 | Great Britain | Mar. 30, 1905 |
| 284,446 | Great Britain | Feb. 2, 1928 |
| 413,815 | France | June 3, 1910 |
| 524,597 | France | May 17, 1921 |